Aug. 27, 1935.  J. F. CRAIG  2,012,746
FLUID PRESSURE AND ELECTRIC BRAKE INTERLOCK
Filed June 27, 1933  2 Sheets-Sheet 1
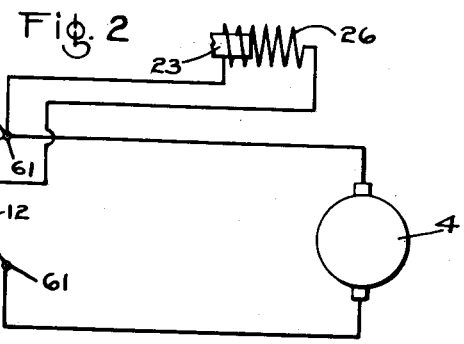
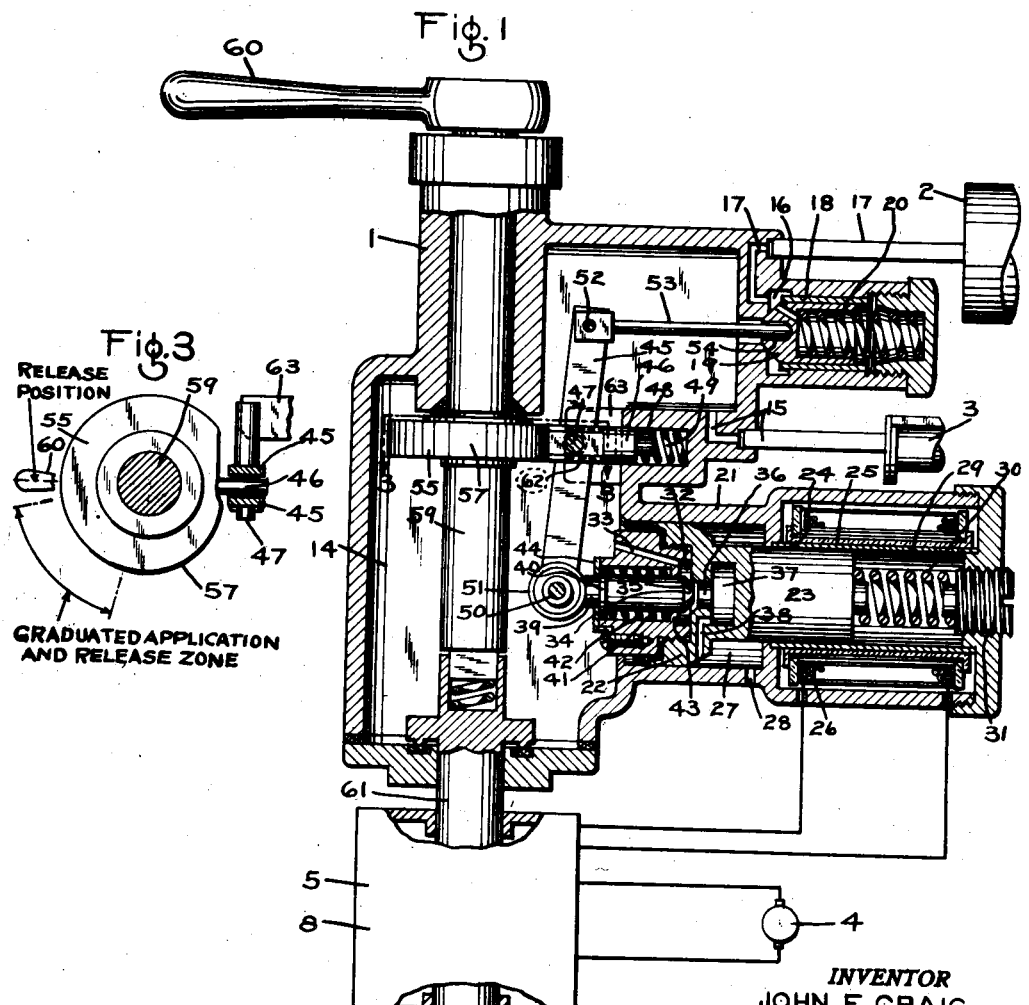
INVENTOR
JOHN F. CRAIG
BY
Wm. M. Cady
ATTORNEY Aug. 27, 1935.                J. F. CRAIG                2,012,746
           FLUID PRESSURE AND ELECTRIC BRAKE INTERLOCK
                    Filed June 27, 1933           2 Sheets-Sheet 2
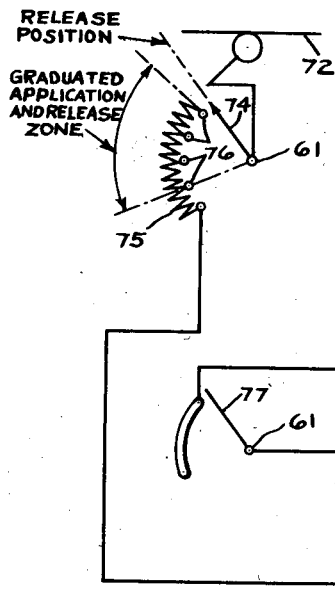
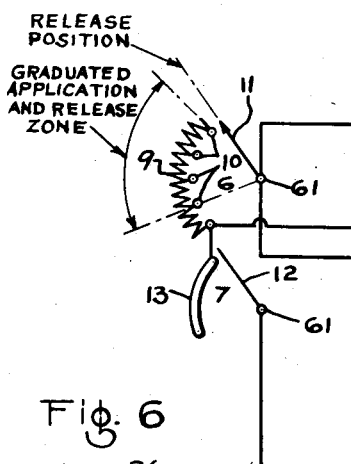
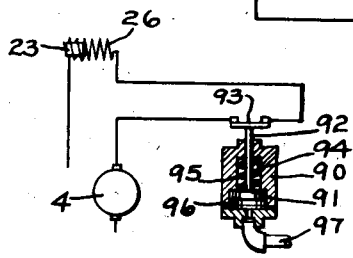
INVENTOR
JOHN F. CRAIG
BY Wm. H. Cady
ATTORNEY Patented Aug. 27, 1935

2,012,746

UNITED STATES PATENT OFFICE

2,012,746

FLUID PRESSURE AND ELECTRIC BRAKE INTERLOCK

John F. Craig, Upper Montclair, N. J., assignor to The Westinghouse Air Brake Company, Wilmerding, Pa., a corporation of Pennsylvania Application June 27, 1933, Serial No. 677,825

15 Claims. (Cl. 303—3)

This invention relates to brake systems for vehicles, and more particularly to that type of system in which both an electric brake equipment and a fluid pressure brake equipment are employed to retard the motion of the vehicle and in which the electric brake equipment is intended to function to effect the major portion of the braking and the fluid pressure brake equipment is automatically brought into action to effect the braking action when the electric brake equipment, due to the reduced speed of the vehicle, becomes substantially ineffective to retard the motion of the vehicle.

With the above mentioned type of brake system considerable difficulty has been experienced in controlling the operation of the system to bring the vehicle to a stop promptly and without dangerous shock. This difficulty is, for the most part, due to the means employed for bringing the fluid pressure brake equipment into braking action, which means functions to cause the fluid pressure brakes to be applied too fast for the operator to control the application. It has been found that to adjust the control means to slow up the fluid pressure brake application so as to eliminate the above mentioned difficulty, another very serious difficulty is experienced, namely, the objectionable increasing of the stopping distance.

The principal object of my invention is to provide a brake system of the above mentioned type having means whereby in effecting an application of the brakes, the fluid pressure brake equipment is caused to operate to initiate a fluid pressure application of the brakes when the speed of the vehicle decreases and gradually increases the braking force of the fluid pressure brake equipment as the braking force of the electric brake equipment diminishes with the diminution in the speed of the vehicle, so as to bring the vehicle to a stop promptly and without dangerous shock.

Another object of my invention is to provide a brake system of the above mentioned type with means automatically operable to control the fluid pressure brake equipment in such a manner in effecting a fluid pressure application of the brakes as to insure a substantially constant braking force being exerted on the vehicle when, due to the decrease in the speed of the vehicle, the braking power of the electric brake equipment is diminished.

Another object of my invention is to provide a brake system of the above mentioned type with a control mechanism which is adapted to be conditioned manually to operate to effect the operation of the electric brake equipment and the fluid pressure brake equipment to provide the maximum braking power on the vehicle for which the control mechanism is conditioned, or in the event of the electric brake equipment being out of order, to effect the operation of the fluid pressure brake equipment to provide the maximum braking power.

A further object of my invention is to provide a brake system of the above mentioned type with a controlling mechanism operable manually to cut the electric brake equipment into braking operation and to control the braking power thereof, and operable electrically according to the speed of the vehicle to control the braking power of the fluid pressure brake equipment to compensate for the decrease in the braking power of the electric brake equipment as the speed of the vehicle reduces.

A still further object of my invention is to provide an improved brake system of the above mentioned type having means conditioned automatically for regulating the application of the brakes according to the load on the vehicle.

Other objects and advantages will appear in the following more detailed description of the invention.

In the accompanying drawings; Fig. 1 is a diagrammatic view, mainly in section, of a brake system constructed in accordance with my invention; Fig. 2 is a diagrammatic view of the electric brake equipment of the brake system shown in Fig. 1 and illustrates the interlock between the two brake equipments, portions of both equipments being omitted to more clearly illustrate the invention; Fig. 3 is a fragmentary sectional view taken on the line 3—3 of Fig. 1, portions of the casing being omitted; Fig. 4 is a diagrammatic view of another brake system embodying my invention; Fig. 5 is a diagrammatic view of a brake system embodying means for controlling the fluid pressure brake equipment according to the load on the vehicle; and Fig. 6 is a diagrammatic view of a portion of an electric brake system embodying an emergency circuit controlling switch device.

The fluid pressure brake equipment of the brake system may comprise a brake valve device 1 of the self-lapping type, a source of fluid pressure, such as a main reservoir 2 and a brake chamber or brake cylinder 3.

The electric brake equipment shown in Figs. 1 and 2 may comprise the vehicle motor 4 and a brake circuit in which there is interposed a brake controlling device 5 comprising a variable resistance unit 6 and a switch 7 which are mounted in a casing 8 in any desired manner.

The variable resistance unit 6 comprises a resistance element 9 having a plurality of spaced contacts 10 which are adapted to be successively engaged by the arm 11 of the unit for varying the amount of resistance cut in the brake circuit, and the switch comprises a rotatable arm 12 adapted to engage a switch contact 13. As shown in Fig. 2 of the drawings, the arms 11 and 12 of the resistance unit and the switch, respectively, maintain the brake circuit open.

The brake valve device 1 comprises a casing which is provided with a pressure chamber 14 which may be in constant open communication with the brake cylinder 3 through a passage and pipe 15.

The casing is also provided with a valve chamber 16 with which the main reservoir 2 is in constant open communication through a pipe and passage 17. Contained in this chamber and slidably mounted in a bushing 18 secured to the casing is a supply valve 19 which is adapted to seat on a valve seat carried by the casing and which is subject on one side to the pressure of a coil spring 20.

The casing is further provided with a cylinder 21 which is open at one end to the chamber 14. Operatively mounted in the cylinder 21, adjacent to its open end, is a movable abutment in the form of a piston 22 having a stem 23 which is slidably guided in a bushing 24 secured to the casing, said bushing carrying an annular member 25 of any desired insulating material, upon which there is wound a solenoid coil 26 which is connected across the electric brake circuit wires in such a manner that the brake circuit is adapted to be closed therethrough by the switch 7. The winding 26 and the piston stem 23 constitute a solenoid for controlling the operation of the piston 22, as will hereinafter be more fully described.

At the stem side of the piston 22, there is a chamber 27 which is constantly open to the atmosphere through a passage 28 in the casing.

At the end of the piston stem there is a chamber 29 containing a coil spring 30 which is interposed between and engages the rear end of the stem and an adjusting member 31 having screw-threaded connection with the casing.

The piston 22 is provided with a valve chamber 32 which is constantly open to the chamber 14 through a passage 33, and which contains a discharge valve 34 adapted to seat on a valve seat 35 carried by the piston, said valve being operative to control communication through a passage 36 leading from the valve chamber 32 to a chamber 37 provided in the piston stem 23. The chamber 37 is constantly open through a passage 38 in the piston 22, to the chamber 27 which, as before described, is constantly open to the atmosphere. The discharge valve is provided with a stem 39 having a collar 40 which slidably engages the piston within a central bore 41 and is subject to the pressure of a light coil spring 42 which is interposed between and engages the collar 40 and an annular lug 43 carried by the piston. Outward movement of the discharge valve relative to the piston 22 is limited by the engagement of the collar 40 with a stop plate 44 which is secured to the piston. The outer end portion of the valve stem 39 extends through an opening in the stop plate 44, and beyond the outer face of the piston 22, is adapted to be operatively engaged by a mechanism which will now be described.

For controlling the operation of the supply and discharge valves 19 and 34, respectively, a mechanism is provided which comprises spaced levers 45 which are pivotally connected, intermediate their ends, to a plunger 46 by means of a pin 47. The rear end of the plunger is slidably guided by the casing within a bore 48 and is subjected to the pressure of a coil spring 49 contained in said bore.

At one side of the pivot pin 47, the ends of the levers 45 are connected together through the medium of a pin 50 and loosely mounted on this pin 50 and disposed between the levers is a roller 51 which is adapted to operatively engage the outer end of the discharge valve stem 39. At the other side of the pivot pin 47, the ends of the levers are connected together by means of a pin 52 on which one end of a valve operating rod 53 is pivotally mounted, the opposite end of the rod operatively engaging the supply valve 19 within a recess 54 formed in the valve.

For the purpose of controlling the operation of the plunger 46, a rotatable cam 55 is provided having a peripheral cam surface 57 adapted to operatively engage the outer end of the plunger. The cam is secured to an operating shaft 59 which is rotatably mounted in the casing and which is adapted to be rotated through the medium of a handle 60 mounted in any desired manner on the outer end of the shaft. The inner end of the shaft is operatively connected to a rotatable shaft 61 which may be journalled in both the brake valve casing and the casing of the control device 5. The arms 11 and 12 of the resistance unit 6 and switch 7 respectively are secured to the shaft 61 so that they will rotate therewith.

The rear end portion of the plunger is preferably round in cross section, and being loosely mounted in the casing, may tend to rotate axially. For the purpose of preventing such rotation, one end of the pivot pin 47 is adapted to engage the casing within an open ended slot 62 which is provided in a lug 63 carried by the casing.

With the brake valve handle 60 in release position, as shown in Fig. 1, the arm 11 of the resistance unit 6 is out of engagement with the first contact 10 of the resistance element 9 and the switch arm 12 is out of engagement with the switch contact 13, so that there will be no current flowing through the brake circuit and consequently the solenoid winding 26 will be deenergized, and by reason of this, the spring 30 acts to maintain the piston 22 in its outer position, as shown in Fig. 1. Further, with the handle 60 in this position, the cam 55, as shown in Figs. 1 and 3, will be in its release position in which it does not exert any pressure on the plunger 46, so that the pressure of the spring 20 maintains the supply valve 19 seated and the pressure of spring 42 maintains the discharge valve 34 unseated, all as shown in Fig. 2.

With the brake circuit open there will be no electric braking action and with the discharge valve 34 unseated, the brake cylinder 3 is open to the atmosphere through pipe and passage 15, chamber 14 in the brake valve casing, passage 33 in the piston 22, valve chamber 32, past the unseated valve 34, passage 36, chamber 37 in the piston stem 23, passage 38, chamber 27 and passage 28.

It will here be understood that both of the springs 20 and 42 are of less resistance than spring 30, so that discharge valve 34 can be seated against the resistance of spring 42 without compressing spring 30, and when valve 34 is seated, the supply valve 19 can be unseated against the resistance of spring 20 without compressing spring 30.

In operation, when it is desired to retard the motion of the vehicle, the usual controller (not shown) is moved to power off position, opening the power circuit to the motor 4 and setting up the circuit for effecting electric braking. The brake valve handle 60 is then moved in a counter-clockwise direction from release position to any desired application position in the graduated application and release zone, causing the shaft 59 and cam 55 secured thereto, as well as shaft 61 and arms 11 and 12 which are secured to the shaft 61, to move in the same direction.

The arm 11, as it is thus moved, engages the first contact 10 of the resistance element 9 and the switch arm as it is moved engages the contact 13. When the switch arm 12 engages the contact 13, the circuit through the motor 4, which is now acting as a generator, and the solenoid winding 26 is closed, so that the counter E. M. F. of the motor energizes the winding and thereby causes the piston stem 23, which serves as an armature, and consequently the piston 22 and discharge valve 34, to move inwardly, i. e., in a direction toward the right hand, compressing the spring 30. When the arm 11 engages the first contact 10 of the resistance element, the electric brake circuit through the motor and resistance element 9 is closed, so that at substantially the same time as the winding 26 is energized, the electric brake equipment functions to initiate the retardation action on the vehicle. By continuing the movement of the handle 60 in a counter-clockwise direction, the arm 11 successively engages the contacts 10 to cut portions of the resistance element 9 out of the electric brake circuit, and as the amount of resistance is thus reduced, the braking effect of the electric brake equipment is increased. When the arm 11 is moved in the opposite direction, more resistance will again be cut in the circuit and as a result, the electric braking effect is decreased. It will thus be seen that by varying the amount of resistance interposed in the circuit, the electric braking effect may be increased or decreased at will.

As the cam 55 is turned through the medium of the shaft 59, the cam surface 57 engages and forces the plunger 46 inwardly, i. e., in a direction toward the right hand, compressing the spring 49. Since the piston 22 and discharge valve 34 carried thereby, have already been moved inwardly by the magnetic pull of the energized winding 26 and offer no resistance to the movement of the levers 45, the spring 20 maintains the supply valve 19 seated, so that the levers rock on the pivot pin 47 in a counter-clockwise direction. Consequently, the roller 51, carried by the levers, is moved toward the outer end of the discharge valve stem 35.

As the speed of the vehicle and consequently the speed of the motor 4 decreases, the counter E. M. F. of the motor also decreases, and as a result the flow of current through the winding 26 diminishes. By reason of this, the magnetic pull on the armature or piston stem 23 becomes less effective. As the magnetic pull on the stem 23 thus decreases, the spring 30, which has been compressed, acting through the medium of the stem, moves the piston 22 and discharge valve 34 outwardly toward the roller 51. Now when the end of the discharge valve stem 39 abuts the roller 51, which is in its adjusted position, the forward movement of the discharge valve is stopped, so that the piston 22 now moves forwardly relative to the discharge valve until the valve seat on the piston engages the discharge valve 34 and closes the communication from the valve chamber 32 to the passage 36 leading to the chamber 37 which is constantly open to the atmosphere. This movement of the piston relative to the discharge valve 34 causes the spring 42 to be compressed, the pressure of the spring when compressed being insufficient to cause the supply valve 19 to be unseated.

However, after the discharge valve is seated, the piston and valve will move forwardly as a unit, and since the end of the discharge valve stem 39 is in engagement with the roller 51, the connected levers 45 are now caused to rock in a clockwise direction on the pivot pin 47, and these levers, acting through the medium of the rod 53, cause the supply valve 19 to be unseated against the resistance offered by the spring 20, so that fluid at main reservoir pressure now flows from the supply valve chamber 16 to the chamber 14 and, from the latter chamber, flows through passage and pipe 15 to the brake cylinder 3, initiating an application of the fluid pressure brake. Since the degree of magnetic pull of the solenoid winding 26 on the piston stem 23 reduces as the speed of the vehicle reduces, the fluid pressure application of the brakes is initiated before any appreciable reduction occurs in the braking power of the electric brake equipment. It will be understood that after the fluid pressure application of the brakes is initiated, both the electric brake equipment and the fluid pressure brake equipment function to retard the vehicle, the braking power of the fluid pressure brake equipment increasing as the braking power of the electric brake equipment diminishes. Due to this compensating action, the braking power, to be obtained for any given position of the brake valve handle in the graduated application and release zone will be maintained substantially constant from the time the electric brake is brought into action until the vehicle comes to a stop, unless the brake valve device has been reconditioned in the meantime by movement of the handle 60 toward release position.

It will here be understood that by the time the speed of the vehicle has been reduced to such a low degree that the electric brake becomes substantially ineffective, say for instance to a speed of about five or six miles per hour, the full brake cylinder pressure for which the brake valve device is conditioned to produce will have been obtained, thus eliminating the possibility of the brake cylinder pressure being increased so rapidly as to cause objectionable shocks.

When the vehicle is brought to a stop the electric brake is, of course, no longer effective and the vehicle is held stationary by the fluid pressure brake equipment with the maximum braking force for which the braking system has been conditioned, by means of the brake valve handle 60, to produce, as will hereinafter more fully appear.

When, after the initiation of the fluid pressure application of the brakes, the pressure of fluid in chamber 14 and acting on one side of the piston 22, is sufficient to overcome the resistance of the spring 30 acting on the piston stem 23, the piston will move inwardly, i. e., in a direction toward the right hand. As the piston is thus moved, the action of the spring 20 causes the supply valve 19 to move toward its seat. Through the medium of the rod 53, the action of the valve 19 causes the connected levers 45 to rock on the pivot pin 47 in a counter-clockwise direction, maintaining the discharge valve 34 seated. Now when the supply valve 19 seats, it closes off the further flow of fluid from the main reservoir 2 to the chamber 14 and brake cylinder, and the inward travel of the piston is stopped by the action of the spring 30. The piston 22 is brought to a stop at substantially the same time as the supply valve 19 seats, so that the spring 20, acting through the medium of the rod 53, pin 52, levers 45, pin 50, roller 51 and discharge valve stem 39, maintains the discharge valve 34 seated. Thus the brake valve device is automatically operated to lap the supply valve while holding the discharge valve closed. If the vehicle is in motion, the magnetic pull of the energized winding 26 on the piston stem 23 helps the fluid under pressure in the chamber 14 to overcome the resistance of the spring 30 and causes the several parts of the brake valve device to move toward lap position. By reason of this, the braking power of the fluid pressure brake will only be increased to such an extent as to compensate for the loss of braking power of the electric brake equipment. When the vehicle is at a stop, the winding 26 is deenergized, so that fluid under pressure alone causes the brake valve parts to move to lap position.

If, when the several parts of the brake valve device have been moved to lap position, as just described, it is desired to reduce brake cylinder pressure, the brake valve handle 60 is moved, in a clockwise direction, to another position in the graduated application and release zone, and as the handle is thus moved, the cam surface 57 of the cam 55 tends to gradually recede from the end of the plunger 39, and as this occurs, the spring 49 acts to move the plunger 46 forwardly, so that the plunger is maintained in contact with the cam surface. This movement of the plunger causes the connected levers 45 to rock in a clockwise direction on the pin 52, permitting the discharge valve spring 42 to act to unseat the discharge valve 34, and with the discharge valve unseated, fluid under pressure is released from the brake cylinder 3 to the atmosphere by way of pipe and passage 15, chamber 14, passage 33 and discharge valve chamber 32 in the piston 22, past the unseated discharge valve 34, passage 36, chamber 37 in the piston stem 23, passage 38, chamber 27 and passage 28 in the casing.

At the same time as the cam 55 is thus rotated, the arms 11 and 12 of the resistance unit 6 and switch 7, respectively, are rotated, the arm 11 cutting more resistance in the electric brake circuit to decrease the braking effect of the electric brake and the arm 12 remaining in engagement with the contact 13. It will here be noted that the switch arm 12 remains in engagement with the contact 13 in all application positions of the brake valve device and functions to open the electric brake circuit only when the brake valve handle 60 is moved to release position.

If, when the cam 55 and arm 11 are in their adjusted position to reduce the braking effect on the vehicle, the speed of the vehicle is such that the counter E. M. F. of the motor 4 is sufficiently high to alone produce the desired braking action, the flow of fluid from the brake cylinder to the atmosphere, by way of the open discharge valve 34, will continue. However, as the effectiveness of the electric brake diminishes, the fluid pressure brake will be cut in and will operate, as hereinbefore described, to increase brake cylinder pressure in such a manner as to compensate for any decrease in the braking power of the electric brake equipment.

To effect a complete release of the brakes, the handle 60 is returned to release position, causing the cam 55 to move to release position and the arms 11 and 12 of the resistance unit 6 and the switch 7 respectively to move to their circuit open position, as shown in Fig. 2. As the cam is being moved toward release position, the action of the spring 42 causes the discharge valve 34, carried by the piston 22, to be unseated as hereinbefore described, permitting fluid under pressure from the chamber 14 and brake cylinder 3 to flow to the atmosphere. As the pressure of fluid in chamber 14 reduces, the spring 30, which has been compressed, acts to move the piston 22 outwardly. The unseated discharge valve now moves forwardly with the piston, causing the levers 45 to rock in a clockwise direction on the pin 47. Since the plunger 46 moves forwardly as the cam surface of the cam recedes, the levers 45 will have no tendency to either seat the discharge valve 34 or unseat the supply valve 19, so that the complete release of the fluid pressure brakes is insured.

If the vehicle is in motion when the brake valve handle 60 is moved to release position, the complete release of the fluid pressure brakes will be effected as just described and due to the operation of the arms 11 and 12 of the resistance unit 9 and switch 7, respectively, the electric brake circuit is opened and the complete release of the electric brake is insured.

In Fig. 4 of the drawings, a brake system is shown diagrammatically which may comprise a fluid pressure brake equipment identical with that illustrated in Figs. 1 and 3 and also comprises an eddy current electric brake equipment.

The eddy current brake equipment comprises a suitable rotor 70 which is secured to an axle of the vehicle. This rotor may be embraced by any desired number of field magnets having windings 71 which are adapted to be connected in circuit with a source of current, such as the trolley wire 72, and ground 73 by means of a switch arm 74 which is secured to the rotatable shaft 61. When this circuit is closed by the arm 74, the magnet windings 71 are energized so that the braking effect is that produced by the short circuited rotor 70 revolving in the magnetic field, and is caused by the short circuit current set up within the rotor itself.

There is included in this electric brake circuit a resistance element 75 having spaced contacts 76 which are adapted to be successively engaged by the arm 74 to vary the braking effect of the eddy current brake device.

With the brake valve handle 60 in release position, the arm 74 will be in its circuit open position as shown.

In this brake system, the winding 26 in the brake valve device is connected in an electric circuit including a motor 4 of the vehicle, said circuit being set up when the usual controller (not shown) is in power off position, and which is controlled by a normally open switch device 77 operative by the shaft 61 and which is also controlled by a magnet switch device 78 which includes a winding 79 connected across a resistance element 80 interposed in the eddy current brake circuit, the force of a spring 81 maintaining the switch in its circuit open position when the winding 79 is not energized.

In operation, when it is desired to retard the motion of the vehicle, the controller is moved to power off position, opening the power circuit to the motor 4 and setting up the circuit for the winding 26. The brake valve handle 60 is then moved in a counter-clockwise direction from release position to any desired application position in the graduated application and release zone, causing shaft 59 and cam 55 secured thereto, as well as shaft 61 and the arm of the switch device 77 and arm 74, which are secured to the shaft 61, to move in the same direction, the arm 74 closing the eddy current brake circuit and the arm of the switch device 77 moving to its circuit closed position.

The flow of current through the eddy current brake circuit causes the eddy current brake device to act to retard the motion of the vehicle.

Current flowing through the eddy current brake circuit also flows through and energizes the winding 79, causing the switch device 78 to operate to complete the electric circuit through the winding 26 of the brake valve device and through the motor 4 which is now acting as a generator. With the circuit through the winding 26 closed by the switch devices 77 and 78, the counter E. M. F. of the motor 4 energizes the winding and thereby causes the piston stem 23 of the brake valve device, which stem serves as an armature, and consequently the piston 22 and discharge valve 34 to move inwardly, compressing the spring 30.

By continuing the movement of the handle 60 in a counter-clockwise direction, the arm 74 successively engages the contacts 76 to cut portions of the resistance element 75 out of the eddy current brake circuit, and as the amount of resistance is thus reduced, the braking effect of the electric brake is increased. When the arm 74 is moved in the opposite direction, more of the resistance element will again be cut in the circuit and, as a result, the electric braking effect is decreased. It will thus be seen that by varying the amount of resistance interposed in the circuit, the electric braking effect may be increased or decreased at will.

The cam 55 turns with the shaft 59 and causes the several other parts of the brake valve device to move in the same manner, as has been described in connection with the equipment shown in Figs. 1 to 3 inclusive.

As the speed of the vehicle, and consequently the speed of the rotor 70 decreases, the effectiveness of the eddy current brake device gradually diminishes and as the speed of the motor 4 decreases, the counter E. M. F. of the motor decreases. From this it will be seen that as the speed of the vehicle reduces the magnetic pull on the armature 23 becomes less effective, so that the spring 30 which has been compressed causes the brake valve parts to move to first close off the atmospheric communication from the brake cylinder 3 and to then supply fluid under pressure from the reservoir 2 to the brake cylinder to effect a fluid pressure application of the brakes. Thus as the braking effect of the eddy current brake gradually decreases, the braking effect of the fluid pressure brake equipment is gradually increased. When the vehicle has been brought to some slow speed or a stop, the eddy current brake will be ineffective and the fluid pressure brakes will be applied with a braking force for which the brake valve device has been conditioned to produce.

If, when the arm 74 is turned to or is in its circuit closing position, there should be an interruption in the flow of current through the eddy current brake, due to the trolley wheel leaving the trolley wire, a broken wire, failure of the source of current, or for any other reason, the winding 79 will be deenergized and the switch device 78 will move from its circuit closed position to its circuit open position. With the switch device 78 in circuit open position, the winding 26 in the brake valve device is deenergized so that the brake valve device will function to apply the fluid pressure brakes with a force for which the brake valve device is conditioned to produce. It will thus be seen that upon failure of the eddy current brake, the brake valve device functions to effect a fluid pressure application of the brakes and that the brake valve device can be manipulated to alone effect the desired braking action, so that, at no time, is there danger of the operator losing control of the vehicle.

The other control operations of the fluid pressure brake equipment are substantially the same as those described in connection with the equipment shown in Figs. 1 to 3 and for this reason a detailed description here of the same is deemed unnecessary.

In some instances it may be desired to incorporate variable load braking means in the brake system whereby the braking force of the system, for any given position of the brake valve device and controlling device 5, will be greater on a loaded vehicle than on a vehicle not loaded. In carrying out this feature of my invention I provide, as shown in Fig. 5, a variable resistance unit 82 which is adapted to be cut into and out of circuit with the winding 26 in the brake valve device, said resistance unit comprising a resistance element 83 and a movable contact arm 84, which arm is automatically actuated as the load on the vehicle is increased to increase the amount of the resistance unit cut in the circuit and as the load on the vehicle is decreased to cut out the resistance element. With the vehicle unloaded all of the resistance unit is cut out of the circuit. The arm 84 may be actuated by any suitable means, but as shown diagrammatically in the drawings, is actuated through the medium of an integral arm 85 which is adapted to engage a member 86 mounted on a truck of the vehicle and which is actuated according to the relative vertical movement between the vehicle body and member 86.

It will be seen that as the load on the vehicle increases and more of the resistance element 83 is cut in circuit with the winding 26, the magnetic pull on the armature 23 is decreased so that the armature and the other parts of the brake valve device actuated thereby will move to their application position sooner than would otherwise be the case. By reason of this the fluid pressure brakes will become more effective as the load on the vehicle is increased.

The variable resistance unit 82 is shown in Fig. 5 incorporated in a brake system of the type shown in Figs. 1 and 2, but it will be understood that it may also be incorporated in the counter E. M. F. circuit of the brake system shown in Fig. 4.

When any of the hereinbefore described brake systems are employed in an equipment having an emergency valve device, a fluid pressure controlled switch device 90 may be employed to control the circuit through the winding 26 of the brake valve device as shown in Fig. 6. This switch device will be so arranged that, upon initiating an emergency application of the brakes, it will operate to open the circuit through the winding 26 so that the winding 26 will, if energized, be deenergized and if deenergized will remain deenergized, so that the several parts of the brake valve device will move promptly to application position.

As shown in Fig. 6, the switch device 90 may comprise a casing in which there is mounted a piston 91 having a stem 92 and a circuit controlling bridge piece 93. At one side of the piston there is a chamber 94 which is at atmospheric pressure and which contains a coil spring 95 which at all times tends to urge the piston to its circuit open position. At the other side of the piston is a chamber 96 which is in open communication through a pipe 97 with the emergency pipe (not shown).

The emergency pipe is normally charged with fluid under pressure and in initiating an emergency application of the brakes, fluid under pressure is vented from the emergency pipe through the medium of an emergency valve mechanism which may be identical with the emergency valve mechanism illustrated in an application of Ellis E. Hewitt, Serial No. 620,993, filed July 6, 1932.

With the emergency pipe charged, fluid under pressure supplied therefrom to the piston chamber 96 maintains the piston 91 in its circuit closed position, as shown, against the opposing pressure of the spring 95. When fluid under pressure is vented from the emergency pipe and consequently from the piston chamber 96, the piston 91 is moved to its circuit open position by the action of the spring 95. With the circuit through the winding 26 open there will be no magnetic pull on the armature 23 and as a consequence the brake valve parts will promptly move to application position, so that if the usual emergency valve device fails to function to supply fluid under pressure to the brake cylinder, the several parts of the brake valve device will operate to effect the application of the brakes.

It will readily be seen that if for any reason and at any time the electric brake of any of the hereinbefore described brake systems should fail to function, the brake valve device can be operated to alone effect the desired braking action, so that, at no time, is there danger of the operator losing control of the vehicle.

From the foregoing description it will be seen that I have provided an interlock between an electric brake equipment and a fluid pressure brake equipment which is so designed and arranged that when the braking power of the electric brake equipment diminishes from that desired for any given application position of the brake valve handle 60 and associated parts, the fluid pressure brake equipment is automatically set in operation to first initiate an application of the fluid pressure brake and to then increase the braking power of the fluid pressure brake equipment as the electric braking force diminishes. It will also be seen that if, for any reason the electrical brake equipment should fail to function to effect an electric braking action when the brake valve handle is moved to an application position, the fluid pressure brake equipment will function to apply the brakes with the maximum force for which the brake valve is conditioned to produce.

While several embodiments of the invention have been described in detail, it is not my intention to limit its scope to these embodiments or otherwise than by the terms of the appended claims.

Having now described my invention, what I claim as new and desire to secure by Letters Patent, is:

1. In a braking system for a vehicle, the combination with an electric braking system operative to apply braking force which decreases as the speed of the vehicle diminishes, of a fluid pressure brake system, means for regulating the degree of application of the electric braking system, means operated according to operation of said last means for conditioning the fluid pressure brake system to be operable to produce a braking force corresponding to the degree of application of the electric braking system, and electrically controlled means for controlling operation of the fluid pressure brake system to cut it into action to a degree according to the decrease in braking force produced by the electric braking system, whereby the braking effect on the vehicle is maintained substantially constant.

2. In a braking system for a vehicle, the combination with parallel circuits associated with an electric brake system, the closure of one of which, when the vehicle is in motion, causes the electric brake system to act to apply braking force on the vehicle, of means operable to close both of said circuits and to regulate the flow of current through the said one circuit so as to vary the maximum braking force obtainable while the speed of the vehicle is above a certain rate, the braking force of the electric brake system diminishing as the speed of the vehicle reduces below said certain rate, a fluid pressure brake apparatus operative to apply braking force on the vehicle, and electrically controlled valve means rendered operable upon closure of the other of said circuits and energized according to the speed of the vehicle to control the operation of the fluid pressure brake apparatus to vary the braking force thereof to compensate for the diminution of the braking force of the electric brake system.

3. In a vehicle brake system, in combination, a brake cylinder, a brake valve device having a manually operated control handle and operable to effect a supply of fluid under pressure to said brake cylinder to a degree according to the degree or extent of movement of said control handle, electric brake means, and electrically controlled means energized by current supplied from said electric brake means for actuating said brake valve device to control the pressure of fluid supplied to said brake cylinder other than according to the degree or extent of movement of said handle.

4. In a vehicle braking system, the combination with a brake cylinder and a brake valve device for controlling the fluid pressure in a chamber open to the brake cylinder and including a normally seated valve operable to supply fluid under pressure to the brake cylinder, a lever for controlling the operation of said valve, means operable manually for positioning said lever in a brake controlling position, and a movable abutment subject on one side to the pressure of said chamber and an opposing pressure for controlling the operation of said lever, of electric braking means, and electrically controlled means energized by current supplied from said electric braking means for controlling the operation of said abutment according to the current supplied thereto.

5. In a vehicle braking system, the combination with a brake cylinder and a brake valve device for controlling the fluid pressure in a chamber open to the brake cylinder and including a normally seated valve operable to supply fluid under pressure to the brake cylinder, a lever for controlling the operation of said valve, means operable manually for positioning said lever in a brake controlling position, and a movable abutment subject on one side to the pressure of said chamber and an opposing pressure for controlling the operation of said lever, of electric braking means, and electrically controlled means energized by current supplied from said electric brake means when the speed of the vehicle is above a predetermined rate for rendering said abutment ineffective to control the operation of said lever and when the speed of the vehicle is below said predetermined rate for rendering said abutment effective to control the operation of the lever.

6. In a vehicle braking system, the combination with a brake cylinder and a brake valve device for controlling the fluid pressure in a chamber open to the brake cylinder and including a normally seated valve operable to supply fluid under pressure to the brake cylinder, a lever for controlling the operation of said valve, a movable abutment subject on one side to the pressure of a spring for operating said lever, a valve carried by said abutment normally establishing communication from said brake cylinder to the atmosphere and adapted to be engaged by said lever when said abutment is moved by the spring and to close said communication upon movement of the abutment relative to the valve when the valve is engaged by said lever, said abutment actuating said lever to unseat the first mentioned valve after the second mentioned valve is closed, of electric braking means, and electrically controlled means energized by current supplied from the electric braking means for controlling the movement of the abutment by said spring.

7. In a braking system for a vehicle, the combination with a circuit associated with an electric brake system, the closure of which, when the vehicle is in motion, causes the electric brake system to act to apply braking force on the vehicle, of means operable to close said circuit and to regulate the flow of current through the circuit to provide a predetermined braking force on the vehicle while the speed of the vehicle is above a certain rate, the braking force of the electric system diminishing as the speed of the vehicle reduces below said certain rate, a fluid pressure brake apparatus operative to apply braking force on the vehicle, and electrically controlled valve means energized according to the speed of the vehicle to control the operation of the fluid pressure brake apparatus to vary the braking force thereof to compensate for variations in the braking force of the electric brake system, and means operable upon initiating an emergency application of the brakes for deenergizing said electrically controlled valve means.

8. In a braking system for a vehicle, the combination with a circuit associated with an electric brake system, the closure of which, when the vehicle is in motion, causes the electric brake system to act to apply braking force on the vehicle, of means operable to close said circuit and to regulate the flow of current through the circuit to provide a predetermined braking force on the vehicle while the speed of the vehicle is above a certain rate, the braking force of the electric brake system diminishing as the speed of the vehicle reduces below said certain rate, a fluid pressure brake apparatus operative to apply braking force on the vehicle, and electrically controlled valve means energized according to the speed of the vehicle to control the operation of the fluid pressure brake apparatus to vary the braking force thereof to compensate for variations in the braking force of the electric brake system, and fluid pressure controlled means operable upon the initiation of an emergency application of the brakes for deenergizing said electrically controlled valve means.

9. In a brake system for a vehicle, the combination with an electric brake system operative to apply braking force to the vehicle which force diminishes with the decrease in the speed of the vehicle, means operative to close the circuit of the system and to regulate the flow of current so as to vary the maximum braking force obtainable, of a fluid pressure brake apparatus operative to apply braking force to the vehicle, electrically controlled means for controlling the operation of said apparatus and operative to increase the braking force of the apparatus as the speed of the vehicle diminishes, and means operable upon the initiation of an emergency application of the brakes to increase the braking force of the apparatus regardless of the speed of the vehicle.

10. In a vehicle brake system, in combination, a brake cylinder, a normally seated supply valve for controlling the supply of fluid under pressure to the brake cylinder, a normally unseated release valve for controlling the release of fluid under pressure from the brake cylinder, a control handle operable to different positions, means mechanically operated by said handle for seating said release valve and for unseating said supply valve to supply fluid under pressure to the brake cylinder, means operated by the pressure of fluid supplied to the brake cylinder for causing seating of said supply valve at a pressure corresponding to the degree of movement of said handle, an electric brake device, means for rendering said electric brake device effective, and means operable when the electric brake device is effective for causing said supply valve to seat at a lower pressure than that corresponding to the degree of movement of said handle.

11. In a vehicle brake system, in combination, a brake cylinder, an electric brake device, a normally seated supply valve for controlling the supply of fluid under pressure to the brake cylinder, a normally unseated release valve for controlling the release of fluid under pressure from the brake cylinder, a circuit for supplying current to the electric brake device for rendering the electric brake device effective to produce a braking effect, a resistance device in said circuit, a control handle operable to different positions, means mechanically operated by said handle for seating said release valve and unseating said supply valve to supply fluid under pressure to the brake cylinder, means also mechanically operated by said handle for operating said resistance device to vary the supply of current to said electric brake device, means operated by the pressure of fluid supplied to said brake cylinder for causing seating of said supply valve at a pressure corresponding to the degree of movement of said handle, and means operable when the electric brake device is effective for causing said supply valve to seat at a lower pressure than that corresponding to the degree of movement of said handle.

12. In a vehicle brake system, in combination, a brake cylinder, a vehicle motor adapted to operate as a generator during braking of the vehicle, an eddy current brake device having an exciting winding, a normally seated supply valve for controlling the supply of fluid under pressure to the brake cylinder, a control handle operable to different positions, means mechanically operated by said handle for unseating said supply valve to supply fluid under pressure to the brake cylinder, means operated by the pressure of fluid supplied to the brake cylinder for causing seating of said supply valve at a pressure corresponding to the degree of movement of said handle, electroresponsive means for causing said supply valve to seat at a lower pressure than that corresponding to the degree of movement of said handle, a first circuit for connecting said electroresponsive means to said vehicle motor when operating as a generator, two normally open contacts in said first circuit adapted when closed simultaneously to cause current to be supplied from said motor to said electroresponsive means, means for closing one of said contacts when said control handle is operated, a second circuit for supplying current to said eddy current brake device, means for supplying current to said second circuit when said control handle is operated, and means responsive to current supplied to the eddy current brake device for closing said other contact in said first circuit.

13. In a vehicle brake system, in combination, a brake cylinder, a brake valve device having an operating handle and a valve arrangement for supplying fluid under pressure to the brake cylinder to a degree according to the degree of movement of said handle, electroresponsive means operable when energized to operate upon said valve arrangement to cause the pressure of fluid supplied to the brake cylinder to be less than that corresponding to the degree of movement of said handle, a generator operated according to the speed of the vehicle for supplying current to energize said electroresponsive means, an eddy current brake device operable when energized to produce a braking effect on the vehicle which diminishes as the speed of the vehicle diminishes, means for supplying current to energize said eddy current brake device, and means operable when the braking effect produced by said eddy current brake device diminishes below a predetermined value to disconnect said electroresponsive means from said generator.

14. In a vehicle brake system, in combination, a brake cylinder, a normally seated supply valve for controlling the supply of fluid under pressure to the brake cylinder, a normally unseated release valve for controlling the release of fluid under pressure from the brake cylinder, a control handle operable to different positions, means mechanically operated by said handle for seating said release valve and for unseating said supply valve to supply fluid under pressure to the brake cylinder, means operated by the pressure of fluid supplied to the brake cylinder for causing seating of said supply valve at a pressure corresponding to the degree of movement of said handle, electromagnetic means for causing said last mentioned means to effect seating of said supply valve at pressures other than that corresponding to the degree of movement of said handle, and means for controlling energization of said electromagnetic means.

15. In a vehicle brake system, in combination, a brake cylinder, a normally seated supply valve for controlling the supply of fluid under pressure to the brake cylinder, a normally unseated release valve for controlling the release of fluid under pressure from the brake cylinder, a control handle operable to different positions, means mechanically operated by said handle for seating said release valve and for unseating said supply valve to supply fluid under pressure to the brake cylinder, means operated by the pressure of fluid supplied to the brake cylinder for causing seating of said supply valve at a pressure corresponding to the degree of movement of said handle, electromagnetic means for causing said last mentioned means to effect seating of said supply valve at pressures other than that corresponding to the degree of movement of said handle, a circuit for supplying current to energize said electromagnetic means, a rheostat in said circuit, and means for actuating said rheostat.

JOHN F. CRAIG.